(12) United States Patent
Davidson

(10) Patent No.: US 11,890,611 B2
(45) Date of Patent: Feb. 6, 2024

(54) CONVERSION SYSTEM FOR WAVE-ROTOR REACTOR SYSTEM

(71) Applicant: New Wave Hydrogen, Inc., Calgary (CA)

(72) Inventor: Mark Davidson, Gainesville, FL (US)

(*) Notice: Subject to any disclaimer, the term of this patent is extended or adjusted under 35 U.S.C. 154(b) by 0 days.

(21) Appl. No.: 17/731,058

(22) Filed: Apr. 27, 2022

(65) Prior Publication Data

US 2022/0339594 A1 Oct. 27, 2022

Related U.S. Application Data

(60) Provisional application No. 63/180,433, filed on Apr. 27, 2021.

(51) Int. Cl.

| | | |
|---|---|---|
| *B01J 8/18* | (2006.01) | |
| *B01J 8/40* | (2006.01) | |
| *C01B 3/02* | (2006.01) | |
| *C10J 3/52* | (2006.01) | |
| *B01J 8/38* | (2006.01) | |

(52) U.S. Cl.
CPC ........... *B01J 8/1818* (2013.01); *B01J 8/1809* (2013.01); *B01J 8/1836* (2013.01); *B01J 8/382* (2013.01); *B01J 8/40* (2013.01); *C01B 3/02* (2013.01); *C10J 3/523* (2013.01); *B01J 2208/00654* (2013.01); *C10J 2300/12* (2013.01)

(58) Field of Classification Search
CPC . B01J 8/40; B01J 8/1818; B01J 8/1836; B01J 8/386; B01J 8/382; B01J 8/1809; B01J 8/002; B01J 8/0035; B01J 8/0045; B01J 3/08; B01J 2208/00743; B01J 2208/00654; C01B 3/24; C01B 3/02
See application file for complete search history.

(56) References Cited

U.S. PATENT DOCUMENTS

| | | | |
|---|---|---|---|
| 2,832,665 | A | 4/1958 | Hertzberg et al. |
| 2,832,666 | A | 4/1958 | Hertzberg et al. |
| 2,902,337 | A | 9/1959 | Glick et al. |
| 2,942,413 | A | 6/1960 | Corbett |
| 2,987,873 | A | 6/1961 | Fox |

(Continued)

FOREIGN PATENT DOCUMENTS

| | | |
|---|---|---|
| CA | 2930838 | 5/2015 |
| WO | WO2016001476 | 1/2016 |

(Continued)

OTHER PUBLICATIONS

Snyder, P. et al., "Assessment of a Wave Rotor Topped Demonstrator Gas Turbine . . . " ASME Paper 96-GT-41, International Gas Turbine . . . Birmingham, UK (Jun. 10-13, 1996).

(Continued)

*Primary Examiner* — Lessanework Seifu
(74) *Attorney, Agent, or Firm* — Rimon P.C.

(57) ABSTRACT

This invention provides for a self-sustaining fluidized bed reactor after the wave rotor reactor in which the reactor may be a fluidized bed reactor, a self-catalytic system, and may include an arrangement for the continuous removal and/or replenishment of particles in the fluidized bed, as well as possibly including a heater for heating the walls and/or a way for managing buildup of solids on the walls of the reactor.

10 Claims, 3 Drawing Sheets

(56) References Cited

U.S. PATENT DOCUMENTS

| | | | |
|---|---|---|---|
| 3,235,341 A | 2/1966 | Hansel | |
| 3,254,960 A | 6/1966 | Hansel | |
| 3,262,757 A | 7/1966 | Bodmer | |
| 3,272,598 A | 9/1966 | Hansel | |
| 3,307,917 A | 3/1967 | Hansel et al. | |
| 3,307,918 A | 3/1967 | Bodmer et al. | |
| 3,355,256 A | 11/1967 | Hansel | |
| 3,503,713 A | 3/1970 | Hansel | |
| 3,998,711 A | 12/1976 | Hertzberg et al. | |
| 4,160,813 A | 7/1979 | Markel | |
| 5,125,793 A | 6/1992 | MacArthur | |
| 5,300,216 A | 4/1994 | Hertzberg et al. | |
| 7,011,800 B1 * | 3/2006 | Mason | C04B 7/24 423/239.1 |
| 7,752,848 B2 | 7/2010 | Balan et al. | |
| 7,802,434 B2 | 9/2010 | Vartharajan et al. | |
| 9,365,775 B1 | 6/2016 | La Crosse | |
| 10,195,574 B2 | 2/2019 | Bedard et al. | |
| 10,384,180 B2 | 8/2019 | Knowlen et al. | |
| 2005/0072152 A1 | 4/2005 | Suzuki et al. | |
| 2009/0133400 A1 | 5/2009 | Callas | |
| 2010/0249468 A1 | 9/2010 | Perkins | |
| 2011/0060178 A1 | 3/2011 | Nafis et al. | |
| 2013/0048486 A1 | 3/2013 | Castillo et al. | |
| 2013/0192321 A1 | 8/2013 | Cheily | |
| 2014/0243569 A1 | 8/2014 | Seppala et al. | |
| 2014/0328749 A1 | 11/2014 | Hammel et al. | |
| 2018/0215615 A1 | 8/2018 | Kielb | |
| 2018/0355794 A1 | 12/2018 | Bulat | |
| 2021/0348557 A1 | 11/2021 | Akbari | |

FOREIGN PATENT DOCUMENTS

| | | |
|---|---|---|
| WO | WO2018144595 | 8/2018 |
| WO | WO 2020/118417 | 6/2020 |

OTHER PUBLICATIONS

Toulson, E., Schock, H., and Attard, W., "A Review of Pre-Chamber Initiated Jet Ignition Combustion Systems," SAE Technical Paper 2010-01-2263 (2010).

J.L. Lauer et al., "Continuous Shock Wave Reactor For Chemical Production and Reaction Studies," 22 Chem. Eng. Sci. 209-215 (1967).

P.H. Rose, "Potential Applications of Wave Machinery to Energy and Chemical . . . ," Proceedings of the 12th Int'l Symposium of Shock Tubes and Waves, Jerusalem, Israel (1979).

E.L. Klosterman et al., "The Use of an Unsteady Wave Chemical Reactor . . . Fuel Production," Proceedings of the 12th Int'l Symposium of Shock Tubes and Waves . . . , Israel (1979).

W.H. Christiansen et al., "Wave Machinery for Chemical Processing and High-Efficiency . . . " Proceedings of the 20th Int'l Symposium on Shock Waves, Pasadena, CA (Jul. 1995).

Jurrian van der Dussen et al., "Design of a Process to Manufacture Ethylene From Ethane By Means of a Shock Wave Reactor," Delft Univ. of Technology (Jun. 2, 2006).

Marco W.M. van Goethem et al., "Ideal Chemical Conversion Concept for the Industrial Production . . . ," 46 Ind. Eng. Chem. Res. 4045-4062 (2007) (published on Web Oct. 13, 2006).

Erdin Kocak, "Embedding of Shock Wave Reactor in Thermal Cracking Process for Ethylene," Delft Univ. of Technology, Dept. of Chemical Technology and Material Science (May 2007).

A. Hertzberg, "Nitrogen Fixation for Fertilizers by Gasdynamic Techniques," Proceedings of the 10th Int'l Symposium on Shock Tubes, Kyoto, Japan (1975).

Carpenter, J.E., et al., An Existing Facility for SCRAM-JET Testing-13 The Wave Superheater, AIAA Journal, pp. 1701-1702, 1967.

Kielb, R., et al., Wave Rotors for Continuous, Vitiate-Free, High-Enthalpy Test Gas Generation, ,ACENT Labgoratories LLC, Hampoton, VA, Dec. 29014.

Carpenter, J.E., et al., "Wave Superheated Hypersonic Tunnel," Semiannual Report No. AD-1345-W-7, Cornell Aeronautical Laboratory, Buffalo, NY 1962.

Fang, Z., et al., Production of Hydrogen from Renewable Resources,: 2015.

Muradov, N., "Low to Near-Zero CO2 Production of Hydrogen from Fossil Fuels: Status and perspectives," Int J Hydrogen Energy, 2017, vol. 42, No. 20, pp. 14058-14088.

Tuchler et al., Validation of a Numerical . . . with Curved Channels, J. of Eng. for Gas Turbines & Power, 2020, vol. 142, No. 2, pp. 021017.

Muradov, Thermocatalytic CO2-Free Production of Hydrogen From Hydrocarbon Fuels, Proceedings of the 2000 Hydrogen Program Review, NREL/CP-570-28890 (2000).

Randy Vander Wal and Mpila Makiesse Nkiawete, "Carbons as Catalysts in Thermo-Catalytic Hydrocarbon Decomposition: A Review," 6 J. Carbon Res. 23, doi:10.3390/c6020023.

Mondal, K. C., Chandran, S. R., "Evaluation of the Economic Impact of Hydrogen . . . Reforming of Methane Process," Int J Hydrogen Energy, 2014, vol. 39, No. 18, pp. 9670-9674.

Abanades, A., "Low Carbon Production of Hydrogen by Methane Decarbonization," Chapter 6 in Production of Hydrogen from Renewable Resources, 2015, Springer, pp. 149-177.

EP Appln. No. 18747576.9—Extended European Search Report dated Jan. 11, 2021.

Akbari, P. et al., Numerical Simulation and Design of a Combustion Wave Rotor for Deflagrative and Detonative Propagation, 42nd AIAA Joint Propulsion Conference, Jul. 2006.

Moshrefi, M. et al., Methane Conversion to Hydrogen and Carbon Black by DC-Spark Discharge, Plasma Chem Plasma Process (2012) pp. 1167-1168.

Akbari, P. et al., Review of Recent Developments in Wave Rotor Combustion Technology, Journal of Propulsion and Power, vol. 25, No. 4, Jul.-Aug. 2009 pp. 833-844.

Akbari, P., Nalim, M.R., and Müller, N., "A Review of Wave Rotor Technology and Its Applications," ASME Journal of Engineering for Gas . . . vol. 128, No. 4, pp. 788-785 (1996).

Wilson, J. and Paxson, D.E., "Wave Rotor Optimization for Gas Turbine Topping Cycles," Journal of Propulsion and Power, vol. 12, No. 4, pp. 778-785 (1996).

Jones, S.M. and Welch, G.E., "Performance Benefits for Wave Rotor Topped Gas Turbine Engines," ASME, 41st Turbo Expo '96, Birmingham, UK (Jun. 10-13, 1996).

Zehnder, G. et al "Comprex® Pressure-Wave Supercharging for Automotive Diesels . . . " SAE Technical Paper Series 840132, International Congress & Exposition, (Feb. 27-Mar. 2, 1984).

Akbari, P. et al., "Performance Enhancement of Microturbine Engines . . . " ASME Journal of Engineering for Gas Turbines and Power, vol. 128, No. 1, pp. 190-202 (2006).

Welch, G.E., Jones, S.M., and Paxson, D.E., "Wave Rotor-Enhanced Gas Turbine Engines," Journal of Engineering for Gas Turbines and Power, vol. 119, No. 2, pp. 469-477 (1997).

A.T. Mattick et al., "Shock-Controlled Chemical Processing," Proceedings of the 19th Int'l Symposium on Shock Waves, Marseille, France (Jul. 1993).

L. Nill et al., "Design of a Supersonic Steam Tunnel for Use As a Shock Wave Reactor," AIAA 95-0016, 33rd Aerospace Sciences Meeting and Exhibit, Reno, NV (Jan. 1995).

Robert K. Masse, "Fluid Dynamics of the Shock Wave Reactor," Ph.D Thesis, Univ. of Washington, (2000).

C. Knowlen et al., "Petrochemical Pyrolysis With Shock Waves," AIAA 95-0402, 33rd Aerospace Sciences Meeting and Exhibit, Reno, NV (Jan. 1995).

A.T. Mattick et al., "Pyrolysis of Hydrocarbons Using a Shock Wave Reactor," Paper 3800, 21st Symposium on Shock Waves, Great Keppel Island, Australia (Jul. 1997).

PCT/IB2021/000305—ISR mailed Aug. 25, 2021.

PCT/IB2021/000305—Written Opinion mailed Aug. 25, 2021.

PCT/CA2021/051789—ISR mailed Mar. 8, 2022.

PCT/CA2021/051789—Written Opinion mailed Mar. 8, 2022.

Muradov, Thermocatalytic CO2-Free Production of Hydrogen From Hydrocarbon Fuels, Proceedings of the 2000 Hydrogen Program review, NREL/CP-50-28890 (2000).

(56) References Cited

OTHER PUBLICATIONS

Holmen, A., Olsvik, O., and Rokstad, O. A., "Pyrolysis of Natural Gas: Chemistry and Process Concepts," Fuel Process. Technol., 1995, vol. 42, pp. 249-267.
Gyarmathy, G., "How Does the Comprex Pressure-Wave Supercharger Work?," SAE Paper 830234, 1983.
Mohammad Mahdi Moshrefi et al., "Methane Conversion to Hydrogen and Carbon Black by DC-Spark Discharge," Plasma Chemistry and Plasma Processing . . . , vol. 32, No. 6, Sep. 9, 2012.
Akbari, P. et al., "Shock Wave Heating: A Novel Method for Low-Cost Hydrogen Production," ASME 2021 International Mechanical Engineering Congress, Nov. 2021.
PCT/CA2022/050645, Notification of Transmittal of ISR& Written Opinion, dated Jul. 15, 2022.
PCT/CA2022/050645, International Search Report, dated Jul. 15, 2022.
PCT/CA2022/050645, Written Opinion of the ISA, dated Jul. 15, 2022.
PCT/CA2021/051789, International Search Report, dated Mar. 8, 2022.
PCT/CA2021/051789, Written Opinion of the ISA, dated Mar. 8, 2022.
Muradov, Thermocatalytic CO2-Free Production ofo Hydrogran From Hydrocarbon Fuels, Proceedings of the 2000 Hydrogen Program Review, NREL/CP-50-28890 (2000).
Randy Vander Wal et al., Carbons as Catalysts in Thermo-Catalytic Hydrocarbon Decomposition: A Review, 6 J. Carbon Res. 23, doi:10.3390/c6020023 (2020).

\* cited by examiner

CONVERSION SYSTEM FOR WAVE-ROTOR REACTOR SYSTEM

COPYRIGHT NOTICE

A portion of the disclosure of this patent document contains material which is subject to copyright or mask work protection. The copyright or mask work owner has no objection to the facsimile reproduction by anyone of the patent document or the patent disclosure, as it appears in the Patent and Trademark Office patent file or records, but otherwise reserves all copyright or mask work rights whatsoever.

CROSS-REFERENCE TO CO-PENDING APPLICATIONS

The present invention is related to the following co-pending U.S. Patent applications, which are all commonly owned with the present application, the entire contents of each being hereby incorporated herein by reference thereto and claims the priority benefit of U.S. Provisional Application No. 63/180,433, filed Apr. 27, 2021; as well as to U.S. patent application Ser. No. 17/307,621, filed on May 4, 201; U.S. patent application Ser. No. 17/545,771, filed on Dec. 8, 2021; U.S. patent application Ser. No. 17/569,659, filed on Jan. 6, 2022; and to U.S. Pat. No. 11,220,428, dated Jan. 11, 2022.

FIELD OF THE DISCLOSURE

This disclosure relates to the enhancement of reforming conversion from wave reformer using self-catalytic systems.

INTRODUCTION

The wave rotor is a direct energy exchange device that utilizes one-dimensional pressure wave action for the transfer of mechanical energy between two compressible fluid flows which are at different pressure levels. The wave rotor typically consists of a cylindrical rotor with an array of long axial channels arranged uniformly around its periphery. The rotor spins between two stationary endplates through which the flow enters and exists. Each endplate has a number of ports to accommodate the incoming and outgoing fluids. Each of the rotating channels operates similar to an individual shock tube. The entry and exit endplates function as the valves and resemble the partitions or diaphragms of the conventional form of shock tube, forming a series of unsteady compression and expansion waves in the channels as they periodically rotate past the inlet and exit ports and regions of closed end walls. To generate compression waves, the channels are exposed to a high-pressure port of a driver gas which enters the channels and compresses the gas within it. To generate expansion waves, the channels are exposed to low-pressure port and the gas in the channels discharges. Rotational motion of the drum gives precise control of the wave processes. By using a large number of channels on the fast-spinning drum, the pulsed process occurring in a single shock tube is translated to a nearly continuous process. Therefore, the wave rotor can be considered as the steady flow analogue of the single pulse shock tube. Steady rotation of the drum establishes unsteady but periodic flow processes within the rotating passages and nearly steady flow in the inlet and outlet ports. In a typical design, the channels are designed axial and arranged parallel to the drive shaft driven by an electric motor (or belt driven). In such a configuration, the only power input to the rotor is that necessary to overcome bearing friction. However, if the tubes are not axial (e.g. curved channels), net power can be even extracted from the rotor similar to that of a turbine in addition to the work exchange between the fluid streams.

A variety of wave rotor configurations have been developed for different applications. The number and azimuthal location of the ports distinguish them for different purposes. For instance, four-port, five-port, and nine-port wave rotors have been investigated for gas turbine engine topping applications. A four-port pressure exchange wave rotor is briefly discussed below to illustrate how it operates. A schematic of a four-port wave rotor is shown in FIG. 1 which uses two inlet ports and two outlet ports. Gaps between the rotor and the endplates faces are exaggerated for clarity, but in practice to minimize gas leakage the gap is kept very small, or the endplates may use sealing material that contact the rotor. The driven (low-pressure fluid) enters the rotor from an inlet port at one end of the rotor. The rotor channel, not shown in FIG. 1 but which extend along the length of the rotor, are filled with the driven gas and rotated to the driver (high-pressure fluid) gas inlet port. Due to the pressure difference between the driver and driven gases, the driver gas is forced into the channels. This initiates shock waves that pass through the channels and compresses the driven fluid already in the channels. The driver gas must be compressed sufficiently so that the required shock strengths are generated within the chemical reactor. Continuous rotation of the drum places the channels between the closed end walls (that bring the channel flow to rest. The energized driven fluid leaves the channels through the first outlet port at the opposite end assisted by generated expansion waves. The de-energized driver gas is then scavenged out of the drum through the secondary outlet port by rotation and the cycle repeats itself. By carefully selecting port locations and their widths, a significant and efficient transfer of energy can be obtained between flows in the connected ducts with minor mixing effects at the gas interfaces. The net effect is an increase in stagnation pressure and temperature of the compressing gas and a decrease in stagnation pressure and temperature for the expanding gas, similar to turbo compressors and turbines. Here, gas dynamic waves are replaced by mechanical blades for energy exchange between the fluids.

The wave rotor has been used as a wave reactor. In most cases, studies have been focused on combustion on-board a wave rotor for power and turbine-based power system. The focus of this invention is on the improvement of reaction extent for a wave-reformer, such as that outlined in U.S. patent application Ser. No. 15/885,453, now U.S. Pat. No. 11,220,428, the entirety of which is hereby incorporated by reference.

In that invention, the wave rotor system is used as a high temperature heater and reactor which allows for conversion of methane (or other hydrocarbon) to its constituent hydrogen gas and solid carbon. This process is known as reforming, and can be partial, leaving some hydrocarbon unreacted, or substantially complete, depending upon the conditions. The solid carbon is formed as small particles, which are carried out of the rotor into a subsequent system.

Carbon is well known to be a catalyst for the reforming reaction, particularly for reforming methane ($CH_4$). See Muradov, "Thermocatalytic $CO_2$-Free Production of Hydrogen From Hydrocarbon Fuels, Proceedings of the 2000 Hydrogen Program Review, NREL/CP-570-28890 (2000).

The catalyst allows for a lower activation energy for the reaction, allowing the reaction rate to be faster at a given temperature.

DESCRIPTION OF PRESENTLY PREFERRED EXAMPLES OF THE INVENTION

Brief Description of Figures

The invention is better understood by reading the following detailed description with reference to the accompanying drawings in which:

In FIG. 2 (1) is a conveyer means or conduit for transporting hot gas exhaust from a wave reformer to the reactor, (2) is an insulated self-catalytic reactor vessel, (3) is a bed of catalytically active particles and/or support material, (4) is a portion of the reactor with expanding cross section to slow fluid velocity to slow small particle carry-over, (5) is a gas product outlet, (6) is a conveyor, preferably an auger, for removal of particles from the catalytic bed, (7) is a motor, preferably speed controlled, to activate the auger, and (8) is a solid particle removal chute.

FIG. 3 shows an approach for separating the solid particles from any high-pressure gas carried over with the particles; and (9) is a diverter valve to direct the path of the solid particles, (10) is one or more collection vessels (two or more required for continuous operation in this embodiment, (11) are solid product removal valves, (12) is a vent for pressurized gases, and (13) are pressure relief valves.

DETAILED DESCRIPTION OF THE INVENTION

A. Overview

Figure 1:
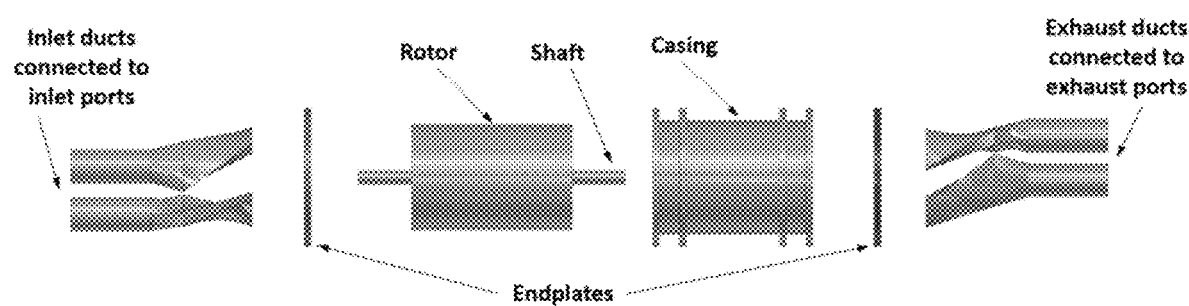
FIG. 1 shows a prior art wave rotor.

To gain a better understanding of the invention, a preferred embodiment will now be described in detail. Frequent reference will be made to the drawings. Reference numerals or letters will be used throughout to indicate certain parts or locations in the drawings. The same reference numerals or letters will be used to indicate the same parts and locations throughout the drawings, unless otherwise indicated.

B. Environment

The preferred embodiment now described will be with respect to wave rotors and those incorporating a fluidized bed. The scale of the embodiment, therefore, is to be understood with respect to this type of article. It is to be understood as well, however, that the invention is applicable to other articles and its scale can vary accordingly.

The wave rotor is an energy exchange device. In this application, the incoming driver gas at high pressure, exchanges its pressure energy to the lower pressure driven gas, which causes rapid heating of that gas. The driven gas, methane in this example, can then decompose. There is, however, a limit to the maximum temperature attained. The temperature rise of the driven gas is limited by the pressure of the driver gas relative to the driven gas. In order to maximize the reaction rate, a higher temperature is desired. However, the limitations of the available pressure ratio can limit the temperature. In this case, the hot unreacted gas exiting the wave rotor can be further reacted at the lower temperature by using a catalyst. The catalyst could be in the gas, coated on the walls, or it could be in a subsequent reaction process.

Since the reaction is catalyzed by solid carbon, and the reaction also generates solid carbon, it is said to be self-catalytic, in that it produces its own catalyst. However, the reaction extent within the wave rotor may not be sufficient to produce enough catalyst particles to provide for sufficient catalytic activity to produce the desired reaction extent.

This invention provides for a self-sustaining fluidized bed reactor after the wave rotor reactor. A fluidized bed consists of a bed of particles with a fluid flowing vertically through the bed. The particles are partially buoyed by the drag of the fluid, but the flow velocity is kept below the point where the drag forces exceed gravity.

Within this fluidized bed, there is excellent contact between the hot gas and the particles formed. The particles can grow as the reaction continues on their surfaces, forming more carbon and releasing hydrogen. This has been demonstrated for conventional thermal decomposition of methane See Randy Vander Wal and Mpila Makiesse Nkiawete, "Carbons as Catalysts in Thermo-Catalytic Hydrocarbon Decomposition: A Review," 6 *J. Carbon Res.* 23, doi: 10.3390/c6020023 (2020).

The reforming reaction rate has been shown to be effective in catalytic reactors as low as 850-900° C.

The fluidized bed is continuously replenished with carbon particles from the reaction. During operation, a portion of the solids in the bed can be removed by, for example, a continuous auger system. The auger speed can be controlled to provide a constant fluidized bed height during operation.

Certain types of carbon have been shown to be more effective than others. In some cases, the carbon formed may be less effective than e.g. activated carbon. The carbon formed may be reactivated by certain treatments. For example treatment with steam and/or $CO_2$ can be effective in increasing catalytic activity. A portion of the material removed continuously could be treated and re-introduced into the bed.

Reaction rates generally increase with increasing temperature. Thus, it may be advantageous to keep the temperature of the reactant gas as high as possible for long enough time to provide the desired reaction extent. This may be enhanced by some heating of the walls of the reactor. As a general rule, wall temperatures greater than ~450° C. may result in thermal decomposition and fouling of the reactor wall with a carbon layer. In operation, this can be limited by a scraping means near the wall. One example would be a rotating set of wiper blades rotating axially inside a tubular reaction vessel.

The reaction vessel also optimally would have an upper portion of greater cross section than the reaction/fluidized bed zone. This allows the fluid velocity to drop below that which would carry significant numbers of particles into the exiting gas stream.

The invention includes a reactor subsequent to the wave rotor reformer. The reactor may be a fluidized bed reactor. It may be a self catalytic system. It may include a means for continuous removal and/or replenishment of the particles in the bed. It also may include a means for heating the walls and/or a means for managing buildup of solids on the walls of the reactor.

The reactor may also include a means for monitoring the amount of material in the bed, such as a level monitor. If such means exists, the speed of removal and/or addition of new material could be controlled via algorithm to maintain constant, optimal bed height in the reactor.

Removal of the solid material from the reactor can be accomplished preferentially by use of an auger system. Auger transport systems can be simple designs which simply transport solids and entrained gases, or they be involve complex seals which allow for pressurized system with most of the gas flow being blocked by the seals and solids entrained in the auger. In the preferred embodiment, the simple auger transports the solids and allows gas to pressurize the downstream receiving vessel. The vessels may be switched between fill, vent, and empty cycles to provide continuous operation.

C. Structure

Figure 2:
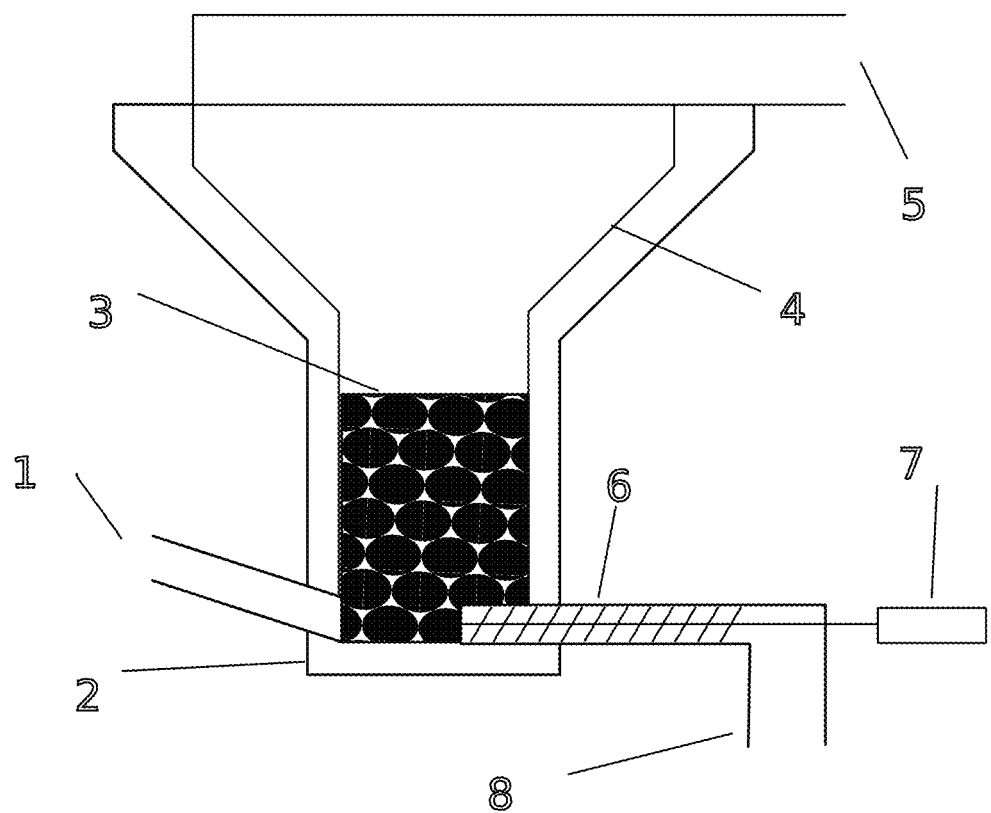
FIG. 2 is a schematic view of a preferred embodiment of the self-catalytic system.

FIG. 2 shows a schematic view of an example continuous self-catalytic reactor. Hot reactant gases and sometimes carbonaceous particles from the wave rotor enter through the entry port via the conveying means (1) which may be an insulated pipe or other means. The reactant species, for example may be carbon particles or carbonaceous solid product of the reforming process, enter the reactor vessel (2) which is preferably insulated and contains a cavity sizes to preferably fluidized the catalyst bed (3). The gases interact with the particles in the bed, causing more carbon and carbonaceous material to be created as either new particles or preferably as growth on existing particles. In a preferred embodiment, near the top of the reactor, the cross sectional area grows in the upper regions of the reactor vessel, causing the gas velocity to decrease below the threshold for carry-over of the particles formed. Thus the particles continue to grow, and larger particles, with smaller drag to mass ratio, are more likely to be in the lower portion of the reactor, and finer particles in the upper portions, preferentially. After the gas has passed through the bed, it is exhausted through the exhaust of the reactor, shown at 5, as mostly gas, with minimal particles.

The mostly larger particles near the bottom of the reactor are the oldest, and thus can be expected to have the least reactivity. Those are removed continuously via a removal means, preferably and auger transport system (6) driven by a speed controlled motor (7) leading to an auger exit 8. The removal rate can be adjusted to keep a constant level of catalyst product in the reactor bed (3).

Figure 3:
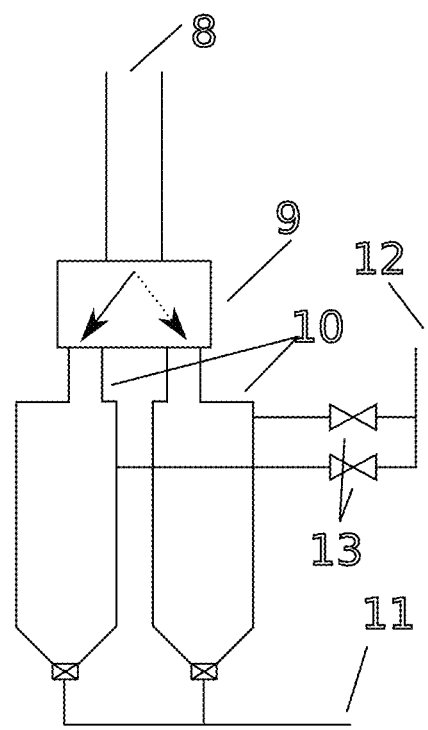
FIG. 3 shows a apparatus for venting pressurized gasses from exiting product.

Since the reactor can be at very high pressure and temperature, some means must be provided for bringing the solid products to atmospheric pressure and for cooling the solid product. One preferred method for extracting the solids is shown in FIG. 3. The product at high pressure and temperature exits from the auger exit (8) and is directed to one or more pressure vessels (10) by a diverter system (9). While solid product and some gas is filling one container, the other side vents the gas pressure fully or partially through the vent (12) by operation of one of the vent valves (13), and the dump valve (11) for the emptying vessel opens to release the carbonaceous product. Continuous operation would require 2 or more of the vessels (10) to be rotated between filling and emptying cycles.

When introducing elements of various aspects of the present invention or embodiments thereof, the articles "a," "an," "the" and "said" are intended to mean that there are one or more of the elements, unless stated otherwise. The terms "comprising," "including" and "having," and their derivatives, are intended to be open-ended terms that specify the presence of the stated features, elements, components, groups, and/or steps, but do not exclude the presence of other unstated features, elements, components, groups, and/or steps and mean that there may be additional features, elements, components, groups, and/or steps other than those listed. Moreover, the use of "top" and "bottom," "front" and "rear," "above," and "below" and variations thereof and other terms of orientation are made for convenience but does not require any particular orientation of the components. The terms of degree such as "substantially," "about" and "approximate," and any derivatives, as used herein mean a reasonable amount of deviation of the modified term such that the end result is not significantly changed. For example, these terms can be construed as including a deviation of at least +/−5% of the modified term if this deviation would not negate the meaning of the word it modifies.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

I claim:

1. A continuous self-catalytic reactor system positioned downstream from a wave rotor reactor comprising: a reactor housing including a catalyst bed, an inlet for admitting hot reactant species to be fed into the catalyst bed to produce a reactor product, a mechanism for removing the reactor product at a desired product removal rate through an exit port without stopping reactor gas flow, and a gas exhaust port to permit gas to exit the continuous self-catalytic reactor system after having passed through the reactor catalyst bed.

2. The continuous self-catalytic reactor system of claim 1 where the mechanism for removing the reactor product is an auger.

3. The continuous self-catalytic reactor system of claim 2 where the reactor product removal rate is controlled by a level sensor operatively connected to a motor controlling rotational speed of the auger to provide an optimal catalyst bed loading with reactant species.

4. The continuous self-catalytic reactor system of claim 1 where a cross-sectional area of the continuous self-catalytic reactor expands in an upper portion of the continuous self-catalytic reactor to allow fluid velocity therein to drop below that which would carry particles into the exiting gas.

5. The continuous self-catalytic reactor system of claim 1 further including two or more pressure vessels to capture the reactor product discharged from the exit port.

6. The continuous self-catalytic reactor system of claim 2 where the auger is sealed to maintain gas pressure therein.

7. The continuous self-catalytic reactor system as in claim 1 wherein the reactant species comprises particles of carbon.

8. The continuous self-catalytic reactor system as in claim 1 wherein the reactant species comprises carbonaceous solid product of a reforming process.

9. The continuous self-catalytic reactor system as in claim 3 wherein the level sensor is ultrasonic.

10. The continuous self-catalytic reactor system as in claim 1 wherein the hot reactant species includes hot gasses and carbonaceous particles.

* * * * *